United States Patent
Chen et al.

(10) Patent No.: US 9,501,289 B2
(45) Date of Patent: Nov. 22, 2016

(54) METHOD OF A UEFI FIRMWARE AND COMPUTER SYSTEM THEREOF

(71) Applicant: American Megatrends Inc., Norcross, GA (US)

(72) Inventors: Hsin-Hung Chen, Taipei (TW); Tung-Han Hsieh, Taipei (TW); Kuan-Chieh Huang, Taipei (TW); Ho-Sui Su, Taipei (TW)

(73) Assignee: AMERICAN MEGATRENDS INC., Norcross, GA (US)

( * ) Notice: Subject to any disclaimer, the term of this patent is extended or adjusted under 35 U.S.C. 154(b) by 213 days.

(21) Appl. No.: 14/583,229

(22) Filed: Dec. 26, 2014

(65) Prior Publication Data

US 2016/0188345 A1  Jun. 30, 2016

(51) Int. Cl.
*G06F 9/44* (2006.01)

(52) U.S. Cl.
CPC .................... *G06F 9/4403* (2013.01)

(58) Field of Classification Search
CPC ............................. G06F 9/4401; G06F 9/441
See application file for complete search history.

(56) References Cited

U.S. PATENT DOCUMENTS 7,134,007 B2* 11/2006 Zimmer ............... G06F 9/4411
  713/1
2005/0240753 A1* 10/2005 Zimmer ............... G06F 9/4425
  713/1

* cited by examiner

*Primary Examiner* — Albert Wang
(74) *Attorney, Agent, or Firm* — McClure, Qualey & Rodack, LLP

(57) ABSTRACT

A computer system includes a memory storing an UEFI firmware and a processor. The UEFI firmware supports pre-boot initialization of a plurality of different bootloader programs, wherein the UEFI firmware has a plurality of instructions and a plurality of configuration data for different bootloader programs. The processor is operatively coupled to the memory and is used to execute the instructions of the UEFI firmware, wherein the instructions include performing the steps of: detecting type of instruction set of the processor; determining, by the processor, a bootup selection mode according to a mode selection, wherein the bootup selection mode corresponds to the detected type of instruction set, and the mode selection corresponds to the type of a bootloader program for execution after the UEFI firmware; retrieving, by the processor, a common configuration data from a plurality of configuration data of the UEFI firmware from the memory; retrieving, by the processor, a distinct configuration data from the plurality of configuration data of the UEFI firmware corresponding to the bootup selection mode from the memory, wherein the distinct configuration data comprises processor instruction sets and runtime services; generating a bootloader address corresponding to the bootup selection mode; and executing, according to the common configuration data and the distinct configuration data, the bootloader program located in a storage corresponding to the bootloader address.

18 Claims, 7 Drawing Sheets

US 9,501,289 B2

METHOD OF A UEFI FIRMWARE AND COMPUTER SYSTEM THEREOF

BACKGROUND

1. Technical Field

The present disclosure generally relates to a method of a UEFI firmware and computer system thereof; particularly, the present disclosure relates to an method and computer system for executing a UEFI firmware, containing variables and instruction sets respectively for a plurality of different bootloader programs, for supporting pre-boot initialization of the different bootloader programs.

2. Description of the Related Art

Traditionally, computing systems may boot to only one operating system. The boot up of the operating system is typically handled by a low level instruction code that is used as an intermediary between the hardware components of the computing system and the operating software and other high level software executing on the computing system. This low level instruction code is often known as the Basic Input/Output System ("BIOS") firmware and provides a set of software routines that allow high level software to interact with the hardware components of the computing system. The firmware performs routines for conducting Power-On Self Test ("POST") each time the computing system is powered on in order to test and initiate all hardware components in the computing system before handing off control to the operating system. These hardware components may include the system main memory, disk drives, and keyboards.

However, as technology has progressed and many different computing systems and operating systems have sprung up, boot up firmwares based on the traditional BIOS standard, which was originally designed for personal computers of International Business Machine Corporation (IBM), have become a point of restriction or limitation as to what the Operating System may control with the hardware. As new hardware and software technologies were being developed, this source of restriction became a major obstacle in the hardware-software interaction. As a result, a new standard of BIOS firmware has been proposed and widely adopted by many major industry leaders. This new standard is called the Unified Extensible Firmware Interface (UEFI).

With the adoption of UEFI standards, BIOS companies were able to produce UEFI firmware for computing systems, while companies producing Operating Systems were able to take advantage of the services these UEFI firmware provided by producing UEFI compliant Operating Systems. However, UEFI requires the firmware and the operating system loader (or kernel) to be size-matched. For instance, a 64-bit UEFI firmware implementation can only load a 64-bit UEFI operating system boot loader or kernel. As a result, for a UEFI compliant computing system having computing architecture (such as x86_64) that can support different processor modes (processor instruction sets), separate boot up images (compiled firmwares) would be needed to address booting up to different operating systems of different processor modes. For example, to support the option of being able to boot into 32-bit or 64-bit Operating Systems on a x86_64 computing system, separate UEFI firmwares respectively addressing the 32-bit and 64-bit Operating Systems would need to be compiled and installed on the computing system. For computing systems with limited memory or limited physical space for memory by design, the added storage requirement for separate UEFI firmwares to be compiled to different boot up images would become a problem for those computing systems. In other cases where the UEFI firmware has already booted the computing system to a particular processor mode, although the operating system boot loader (or kernel) can change processor modes if it desires, runtime services will be bar from usage (unless the kernel switches back again). Therefore, there is a need to reduce the complexities that come from having multiple UEFI boot up firmware in order to support multiple UEFI compliant Operating Systems.

SUMMARY

It is an objective of the present disclosure to provide a computing system and a method thereof having an UEFI firmware that can support multiple Operating Systems of different processor modes.

It is another objective of the present disclosure to provide a computing system and a method thereof having an UEFI firmware that can reduce the amount of space required by the UEFI firmware to support booting into different Operating Systems of different processor modes.

According to one aspect of the invention, a computer system includes a memory storing an UEFI firmware and a processor. The UEFI firmware supports pre-boot initialization of a plurality of different bootloader programs, wherein the UEFI firmware has a plurality of instructions and a plurality of configuration data for different bootloader programs. The processor is operatively coupled to the memory and is used to execute the instructions of the UEFI firmware, wherein the instructions include performing the steps of: detecting type of instruction set of the processor; determining, by the processor, a bootup selection mode according to a mode selection, wherein the bootup selection mode corresponds to the detected type of instruction set, and the mode selection corresponds to the type of a bootloader program for execution after the UEFI firmware; retrieving, by the processor, a common configuration data from a plurality of configuration data of the UEFI firmware from the memory; retrieving, by the processor, a distinct configuration data from the plurality of configuration data of the UEFI firmware corresponding to the bootup selection mode from the memory, wherein the distinct configuration data comprises processor instruction sets and runtime services; generating a bootloader address corresponding to the bootup selection mode; and executing, according to the common configuration data and the distinct configuration data, the bootloader program located in a storage corresponding to the bootloader address.

According to another aspect of the invention, a method of computer processor execution of UEFI firmware supporting pre-boot initialization of a bootloader program from a plurality of bootloader programs, the UEFI firmware located in a memory, the memory operatively coupled to the processor, the method comprising: executing, by the processor, the UEFI firmware; when executing the UEFI firmware: detecting type of instruction set of the processor; determining a bootup selection mode according to a mode selection, wherein the bootup selection mode corresponds to the detected type of instruction set, and the mode selection corresponds to the type of a bootloader program for execution after the UEFI firmware; retrieving, by the processor, a common configuration data from a plurality of configuration data of the UEFI firmware from the memory; retrieving, by the processor, a distinct configuration data from the plurality of configuration data of the UEFI firmware corresponding to the bootup selection mode from the memory, wherein the distinct configuration data comprises processor instruction sets and runtime services; generating a bootloader address corresponding to the bootup selection mode; and executing, according to the common configuration data and the distinct configuration data, the bootloader program located in a storage corresponding to the bootloader address.

DETAILED DESCRIPTION OF THE PREFERRED EMBODIMENT

Embodiments of the present invention provide methods and systems for executing a bootup firmware capable of supporting pre-boot initialization of a bootloader program from a plurality of bootloader programs. In the following detailed description, references are made to the accompanying drawings that form a part hereof, and in which are shown by way of illustration specific embodiments or examples. These embodiments are only illustrative of the scope of the present invention, and should not be construed as a restriction on the present invention. Referring now the drawings, in which like numerals represent like elements through the several figures, aspects of the present invention and the exemplary operating environment will be described.

The present disclosure provides a computing system and method thereof for execution of UEFI firmware supporting pre-boot initialization of a bootloader program. Preferably, the computing system includes, but is not limited to, laptop computers, personal computers, computer servers, handheld computing devices such as mobile telephones and tablet computers, as well as wearable computing devices.

Figure 1:
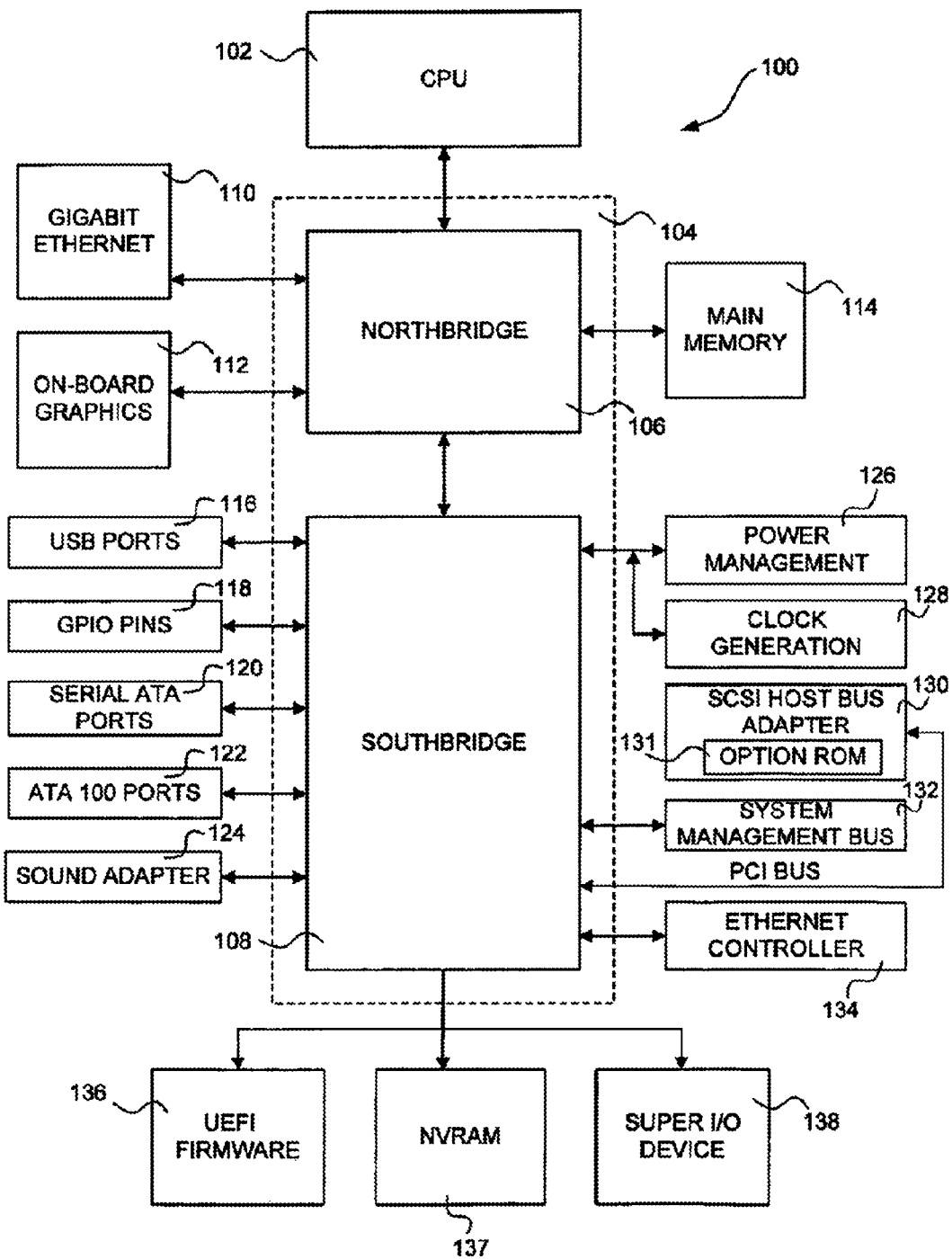
FIG. 1 is a view of an embodiment of the computer system.

FIG. 1 and the following discussion are intended to provide a brief, general description of a suitable computing environment in which the invention may be implemented. However, those skilled in the art will recognize that the invention may also be implemented in other suitable computing environments. Moreover, those skilled in the art will appreciate that the invention may also be practiced with other computer system configurations, including multiprocessor systems, microprocessor-based or programmable consumer electronics, minicomputers, mainframe computers, and the like. The invention may also be practiced in distributed computing environments where tasks are performed by remote processing devices that are linked through a communications network.

Referring to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer system 100 that is operative to initiate an operating system boot from firmware. The blocks of FIG. 1 are intended to represent functional components of the computer architecture and are not intended to necessarily represent individual physical components. Functional components described may be combined, separated, or removed without departing from the overall sense and purpose of the computer architecture.

In order to provide the functionality described herein, the computer system 100 includes a baseboard, or "motherboard", which is a printed circuit board to which a multitude of components or devices may be connected by way of a system bus or other communication path. In one illustrative embodiment, a central processing unit (CPU) 102 operates in conjunction with a chipset 104. The CPU 102 may be a standard central processor that performs arithmetic and logical operations necessary for the operation of the computer. The CPU 102, in this and other embodiments, may include one or more of a microprocessor, a microcontroller, a field programmable gate array (FPGA), a complex programmable logic device (CPLD), an application specific integrated circuit (ASIC), and/or any other electronic computing device.

The chipset 104 includes a northbridge 106 and a southbridge 108. The northbridge 106 provides an interface between the CPU 102 and the remainder of the computer system 100. The northbridge 106 also provides an interface to one or more random access memories (RAM) used as a main memory 114 in the computer system 100 and, possibly, to an on-board graphics adapter 112. The northbridge 106 may also enable networking functionality through a gigabit Ethernet adapter 110. The gigabit Ethernet adapter 110 is capable of connecting the computer system 100 to one or more other computers via a network. Connections that may be made by the adapter 110 may include local area network (LAN) or wide area network (WAN) connections, for example. LAN and WAN networking environments are commonplace in offices, enterprise-wide computer networks, intranets, and on the Internet. The northbridge 106 is connected to the southbridge 108.

The southbridge 108 is responsible for controlling many of the input/output functions of the computer system 100. In particular, the southbridge 108 may provide one or more universal serial bus (USB) ports 116, a sound adapter 124, an Ethernet controller 134, and one or more general purpose input/output (GPIO) pins 118. The southbridge 108 may also provide a bus for interfacing peripheral card devices such as a BIOS boot specification (BBS) compliant SCSI host bus adapter 130. In one embodiment, the bus comprises a peripheral component interconnect (PCI) bus. The southbridge 108 may also provide a system management bus 132 for use in managing the various components of computer system 100. Power management circuitry 126 and clock generation circuitry 128 may also be utilized during operation of the southbridge 108.

The southbridge 108 is also operative to provide one or more interfaces for connecting mass storage devices to the computer system 100. For instance, according to an embodiment, the southbridge 108 includes a serial advanced technology attachment (SATA) adapter for providing one or more serial ATA ports 120 and an ATA100 adapter for providing one or more ATA100 ports 122. The serial ATA ports 120 and the ATA100 ports 122 may be, in turn, connected to one or more mass storage devices storing an operating system, application programs, and other data. As known to those skilled in the art, an operating system comprises a set of programs that control operations of a computer and allocation of resources. An application program is software that runs on top of the operating system software, or other runtime environment, and uses computer resources to perform application specific tasks desired by a user of the computer system 100.

The mass storage devices connected to the southbridge 108 and the SCSI host bus adapter 130, and their associated computer-readable media, provide non-volatile storage for the computer system 100. Although the description of computer-readable media contained herein refers to a mass storage device, such as a hard disk or CD-ROM drive, it should be appreciated by those skilled in the art that computer-readable media can be any available media that can be accessed by the computer system 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the southbridge 108 for connecting a Super I/O device 138. The Super I/O device 138 is responsible for providing a number of input/output ports, including a keyboard port, a mouse port, a serial interface, a parallel port, and other types of input/output ports. The LPC interface or another interface may be utilized to connect a computer storage medium such as a ROM or a non-volatile random access memory (NVRAM) 137 such as a flash memory. The computer storage medium may be used for storing the firmware 136 that includes modules containing instructions and data that help to startup the computer system 100 and to transfer information between elements within the computer system 100.

The firmware 136 may include program code that is compatible with the UEFI specification. It should be appreciated that in addition to the firmware 136 including an UEFI-compatible firmware, other types and combinations of firmware may be included. For instance, the firmware 136 may include additionally or alternatively a BIOS firmware and/or other type of firmware known to those in the art. Additional details regarding the operation of the UEFI firmware 136 are provided below with respect to the subsequent diagrams. It should be appreciated that the computer system 100 may not include all of the components shown in FIG. 1, may include other components that are not explicitly shown in FIG. 1, or may utilize an architecture completely different than that shown in FIG. 1.

Figure 2:
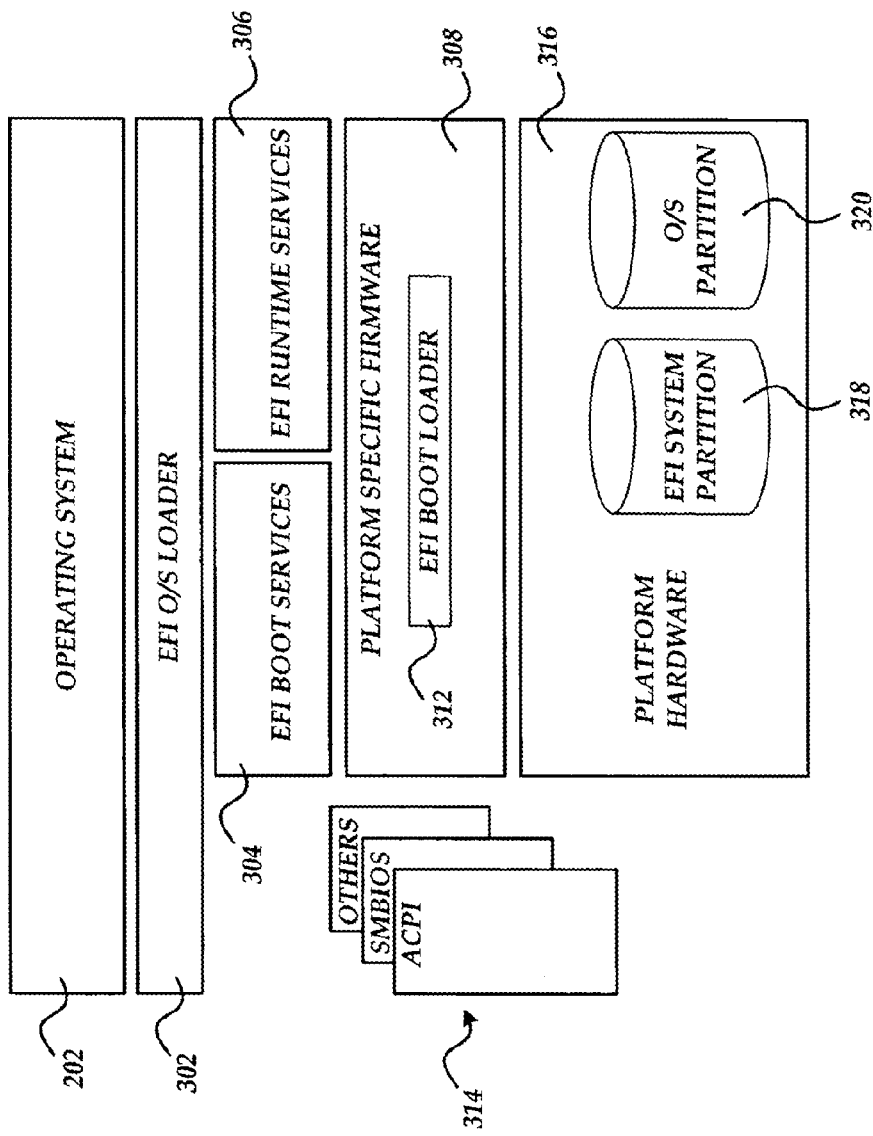
FIG. 2 is a view of an UEFI specification-compliant system.

Referring to FIG. 2, additional details regarding an UEFI specification-compliant system that may be utilized to provide an operating environment for the various implementations presented herein will be described. As shown in FIG. 2, the system includes a platform hardware 316 and an operating system (OS) 202. A platform firmware 308 may retrieve OS program code from the EFI system partition 318 using an OS loader 302, sometimes referred to as a boot loader or an OS boot loader. Likewise, the OS loader 302 may retrieve OS program code from other locations, including from attached peripherals or from the firmware 136 itself. The EFI system partition 318 may be an architecturally shareable system partition. As such, the EFI system partition 318 defines a partition and file system that are designed to allow safe sharing of mass storage between multiple vendors. An OS partition 320 may also be utilized.

Once started, the OS loader 302 continues to boot the complete operating system 202, potentially loading the operating system in stages, as with the GRUB, commonly associated with Linux operating systems. The OS loader 302 may use EFI boot services 304 and interface to other supported specifications to survey, comprehend, and initialize the various platform components and the operating system 202 software that manages them. Thus, interfaces 314 from other specifications may also be present on the system. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 are available to the OS loader 302 during the boot phase and to an operating system 202 when it is running. For example, runtime services may be presented to ensure appropriate abstraction of base platform hardware resources that may be needed by the operating system 202 during its normal operation. EFI allows extension of platform firmware by loading EFI drivers and EFI application images which, when loaded, have access to all EFI-defined runtime and boot services. Once the EFI firmware is initialized, it passes control to the boot loader 312.

Figure 3:
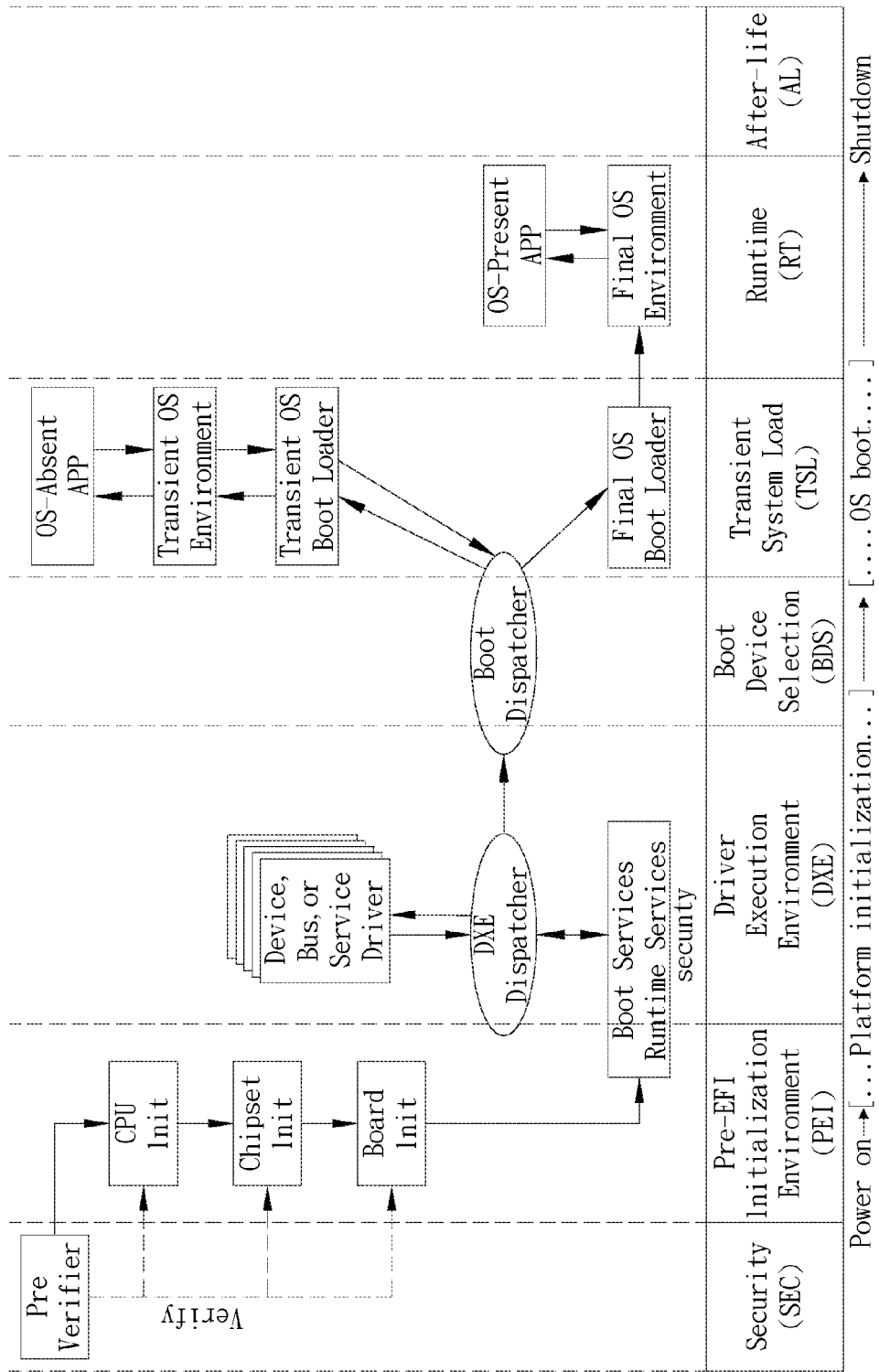
FIG. 3 is a view of the different phases during execution of an UEFI firmware.

Referring to FIG. 3, details are shown to illustrate the different phases in the boot up of an Operating System by a UEFI firmware. As shown in FIG. 3, when the computer system 100 is powered on, the UEFI firmware of the present invention is executed by the processor of the computer system 100. The UEFI firmware will first enter a Security (SEC) phase, wherein no memory has yet been initialized in the computer system 100. In the present phase, since no memory has yet been initialized, the processor's cache is used as a Random Access Memory (RAM) to pre-verify the central processing unit (CPU), the chipset, and the main board. Next, the UEFI firmware enters the Pre-EFI Initialization (PEI) phase, wherein the CPU, the chipset, the main board, and the memory of the computer system 100 are initialized. In the Driver Execution (DXE) phase, boot services, runtime services, and driver execution dispatcher services may be executed to initialize any other hardware in the computer system 100. Following the DXE phase, the UEFI firmware enters into the Boot Device Selection (BDS) phase. In the BDS phase, attempts are made to initialize console devices as well as various drivers corresponding to the boot loader for the Operating System. In the Transient System Load (TSL) phase, control is handed off to the Operating System to continue the start up of the computer system 100 before reaching the Runtime (RT) phase of normal operation of the computer system 100.

Figure 4:
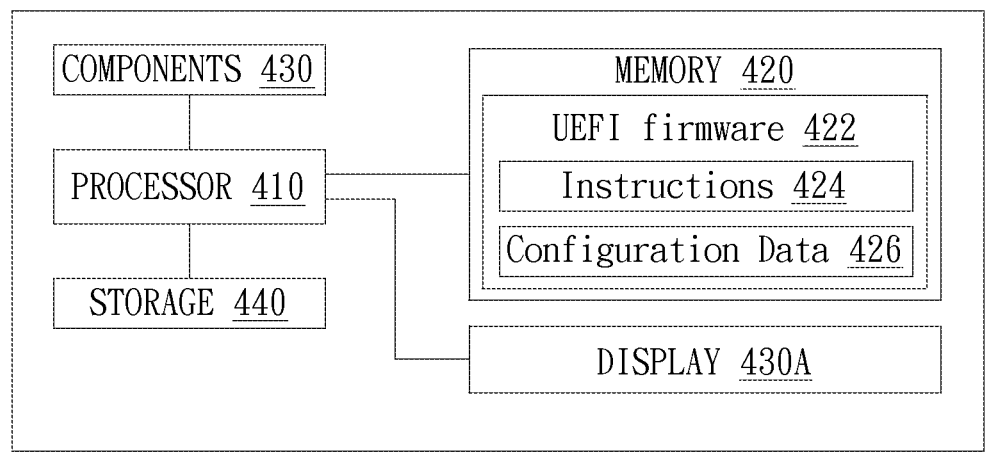
FIG. 4 is a view of another embodiment of the computer system.

FIG. 4 illustrates an aspect of the embodiment of the present invention. As shown in FIG. 4, the computer system 100 may include a processor 410, a memory 420, components 430, a storage 440, and a display 430A, wherein the processor 410 is respectively coupled to the memory 420, the components 430, the storage 440, and the display 430A. One skilled in the art should be able to appreciate that the depiction of the computer system 100 in FIG. 4 may be viewed in conjunction with or separate from the computer system illustrated in FIG. 1. In the present embodiment, the memory 420 may be a flash memory or CMOS to store the UEFI firmware 422, wherein the UEFI firmware 422 has instruction sets 424 and configuration data 426. The storage 440 may be a hard drive disk, external drive, flash drive, network drive, or any other memory storage, wherein the storage 440 stores the EFI partition consisting of the boot up loader for the Operating System of the Computer system 100. The components 430 and the display 430A may be considered as hardware devices that are initialized by the UEFI firmware during execution of the UEFI firmware in the boot up period.

Figure 5:
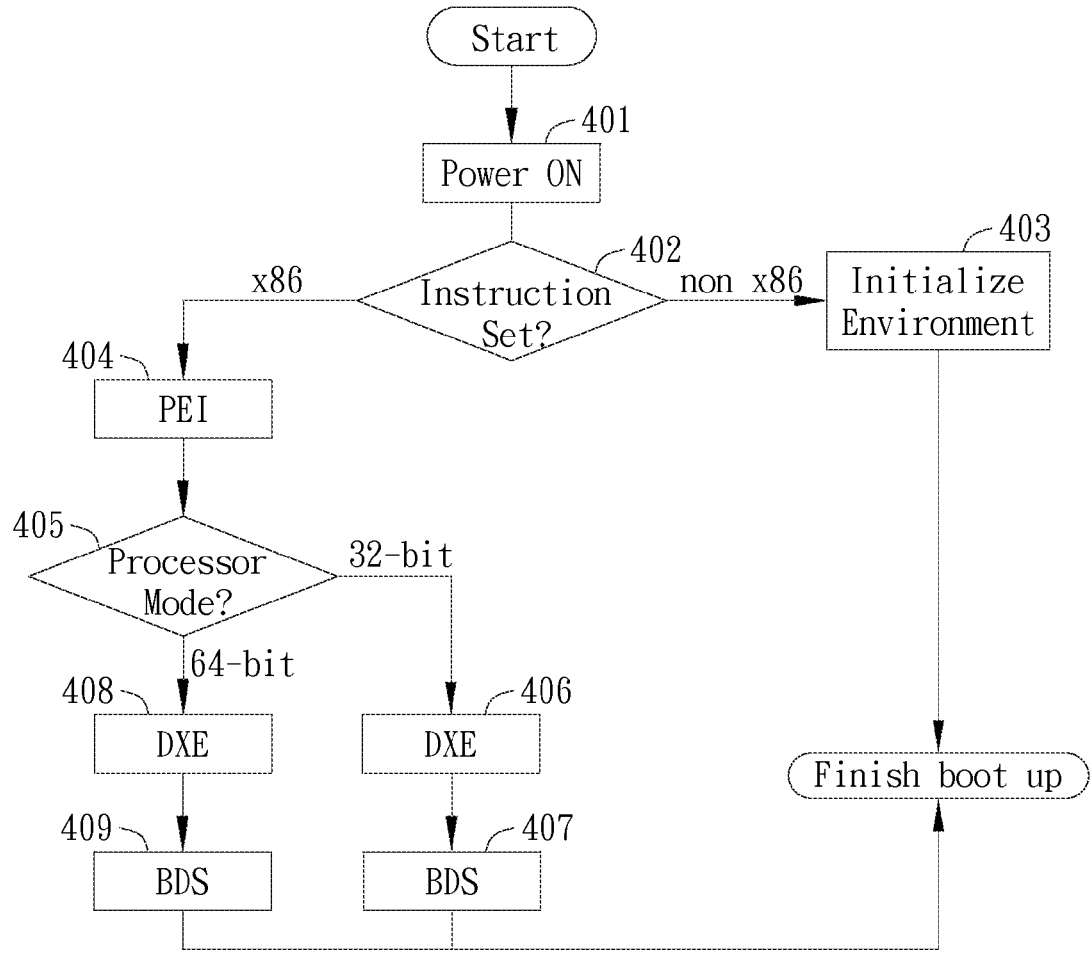
FIG. 5 is a flowchart of the execution of the UEFI firmware.

FIG. 5 is an illustration of a flowchart of execution of the UEFI firmware in the computer system 100 of the present invention. Referring to FIGS. 4 and 5, when the computer system 100 is powered ON in step 401, the computer system 100 start to execute the UEFI firmware 422. In one embodiment, the UEFI firmware 422 can detect and determine the instruction set of the processor 410 to determine the processor architecture of the computer system 100. For instance, as exemplarily shown in FIG. 5, if the processor is determined to be a non x86 processor architecture such as an ARM processor architecture, the UEFI firmware 422 will proceed to step 403 of continuing the boot up process. For purposes of explanation, the present invention will be described in detail following the x86 chipset architecture. However, it should be obvious to one skilled in the art that the present invention may be applied to other different processor architectures. The explanations below are not meant to limit or restrict the scope of the disclosure. As shown in FIGS. 4 and 5, if the processor 410 is determined to be of x86 architecture, the UEFI firmware 422 will proceed to step 404 and enter into the PEI phase. After pre-verification and initialization of the processor is completed, the processor, through executing UEFI firmware 422, will determine the processor mode or type of instruction set of the processor in step 405. In the present embodiment, if the processor mode is determined to be 32-bit, the UEFI firmware 422 will proceed to step 406 of the DXE phase. However, if the processor mode is determined to be 64-bit, the UEFI firmware 422 will proceed to step 408 of the DXE phase.

As previously mentioned, during the boot period under UEFI conventions, the UEFI firmware 422 can only invoke boot loaders of the same size instruction set. In the example seen in FIG. 5, this would mean that if the computer system 100 initialized the pre-OS environment with the 64-bit processor mode, the UEFI firmware 422 can only call on a corresponding boot loader of an 64-bit Operating System. Likewise, if the UEFI firmware 422 initialized the pre-OS environment with the 32-bit processor mode, the UEFI firmware 422 would only be able to call on a corresponding boot loader of a 32-bit Operating System. Due to the fact that instruction sets of 32-bit and 64-bit are completely different, UEFI firmware manufacturers would typically need to compile two separate firmware images corresponding to the 32-bit mode and the 64-bit mode to insure that the computer system 100 may be booted into the 32-bit Operating System or the 64-bit Operating System respectively. However, this increases the overall storage size required to store the firmware images. As well, providing updates, patches, or maintenance for the different images of the UEFI firmware would become quite complex and difficult since manufacturers would be required to reflash multiple different images or keep track of each variable in the configuration tables of each image in order to synchronize code patching across the different firmware images.

Figure 6A:
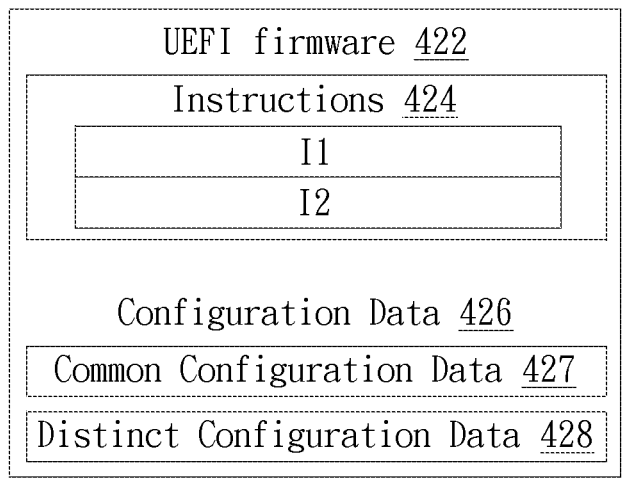
FIG. 6A is a view of an embodiment of the single UEFI firmware package.
Figure 6B:
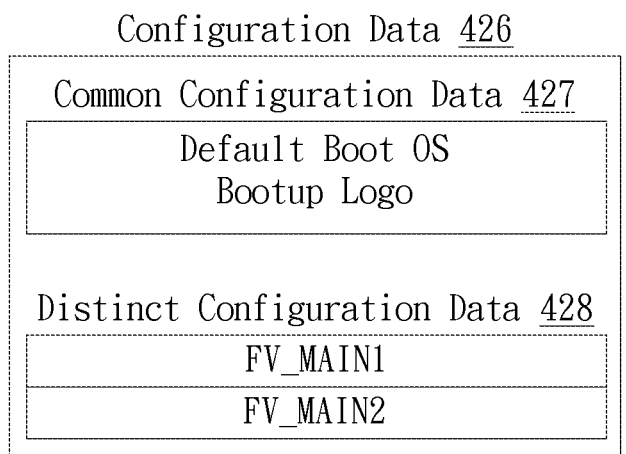
FIG. 6B is a view of an embodiment of the common and distinct configuration data.

Referring to FIG. 6A, FIG. 6A illustrates of an embodiment of a new data structure for the UEFI firmware. As shown in FIG. 6A, the present disclosure proposes packaging the different firmware images into one single image package. In order to accomplish this, in the present embodiment, the variables in the respective configuration tables for the 32-bit firmware image and the 64-bit firmware image are compared and classified as being common data or distinct data. Any variables that are common to both firmware images are classified as common. Likewise, any variables that are not common to both firmware images are classified as distinct. When compiling into a single firmware image, the common variables are grouped into a table of common configuration data 427 and the distinct variables are grouped into a table of distinct configuration data 428. For instance, as illustrated in FIG. 6B of an exemplary embodiment of the configuration data 126, the common configuration data 127 may include variables indicating the default boot OS or variables addressing a boot up logo that are common to all the different boot loaders that the UEFI firmware can initiate. By grouping common variables together, duplicates of the variables from the plurality of different firmware images may be eliminated. In this manner, the overall size of the firmware image package may be reduced. Another advantage to this data structure is that manufacturers may be better able to keep track of the variables across the different processor modes as well as perform more simply updates on the UEFI firmware. In addition, any variable changes conducted while in the Operating System environment may be instantly reflected when the computer system 100 is restarted. For instance, while in the 64-bit mode in the Operating System, the Operating System may be able to change the default boot variable to indicate the 32-bit mode. In such a manner, on the subsequent restart, the computer system 100 may be able to detect the variable change and correspondingly initialize the hardware and the boot up process in the 32-bit processor mode such that a corresponding 32-bit Operating System may be booted up.

In other different aspects of the embodiment, when the computer system 100 is powered ON and after the PEI but before the DXE phase, the UEFI firmware may direct the processor to initialize a hardware console such as a keyboard, touch sensitive screen, or any other console capable of allowing simple input from users. During this instance, users would be allowed to key-in or input a command representing a mode selection, wherein the mode selection refers a particular process mode and/or Operating System that the user would like the computer system 100 to boot up. For instance, pressing Function Key with "1" could indicate to the UEFI firmware that the user would like the computer system 100 to boot to 32-bit mode Operating System or pressing Function Key with "2" could indicate the user would like the UEFI firmware to boot to 64-bit mode Operating system.

As shown in FIGS. 5 and 6A, since different processor modes require correspondingly different instruction sets such that the processor can understand and execute the instructions correctly, the UEFI firmware 422 may also have a table of instructions 424 that correspondingly has instructions I1 and I2. Returning to the dual Operating System of 32-bit and 64 bit example, the instructions I1 could correspond to the 32-bit instruction set and the instructions I2 could correspond to the 64-bit instruction set. When execution of the UEFI firmware 422 reaches step 405, in one aspect of the embodiment the variables in the configuration data 126 may be checked to determine which processor mode should be executed. For instance, if a GUID default boot mode is set to be 32-bit mode, the execution of the UEFI firmware 422 will proceed to the DXE phase of step 406. As mentioned previously, in the DXE phase, instruction sets and runtime services particular to the processor mode may be executed. In this instance, 32-bit instruction set I2 would be executed. The common configuration data 427 and distinct configuration data 428 corresponding to the bootup selection mode (ex. determined from checking the default boot mode variable from the common configuration data 427) is retrieved by the processor. A bootloader address corresponding to the bootup selection mode is generated by the processor such that the bootloader program located in the storage 440 (EFI partition) of the computer system 100 corresponding to the bootloader address is executed according to the retrieved common configuration data and the distinct configuration data. In other words, only instructions 424 and configuration data 126 that correspond to the bootup selection mode is retrieved to bootup the corresponding bootloader program in the EFI partition. In this manner, hardware initialization in the pre-OS environment can be tailored to the specific Operating System corresponding to the specific bootloader program (also corresponding to the bootup selection mode).

In another aspect of the embodiment, in the DXE phase of steps 406 or 408, runtime services may be instantiated. It should be appreciated by one skilled in the art that since instantiating runtime services requires function calls of different parameters when comparing under the 32-bit processor mode and the 64-bit processor mode, the different paths taken from step 405 to 406 and from step 405 to 408 would result in different runtime services that may not be mutually utilized by their respective operating systems. For example, similar to initiating execution of the bootloader program, the execution of runtime services may depend on one or more combinations of the instructions sets 424, the common configuration data 427, and the distinct configuration data 428 corresponding to the bootup selection mode.

Figure 7:
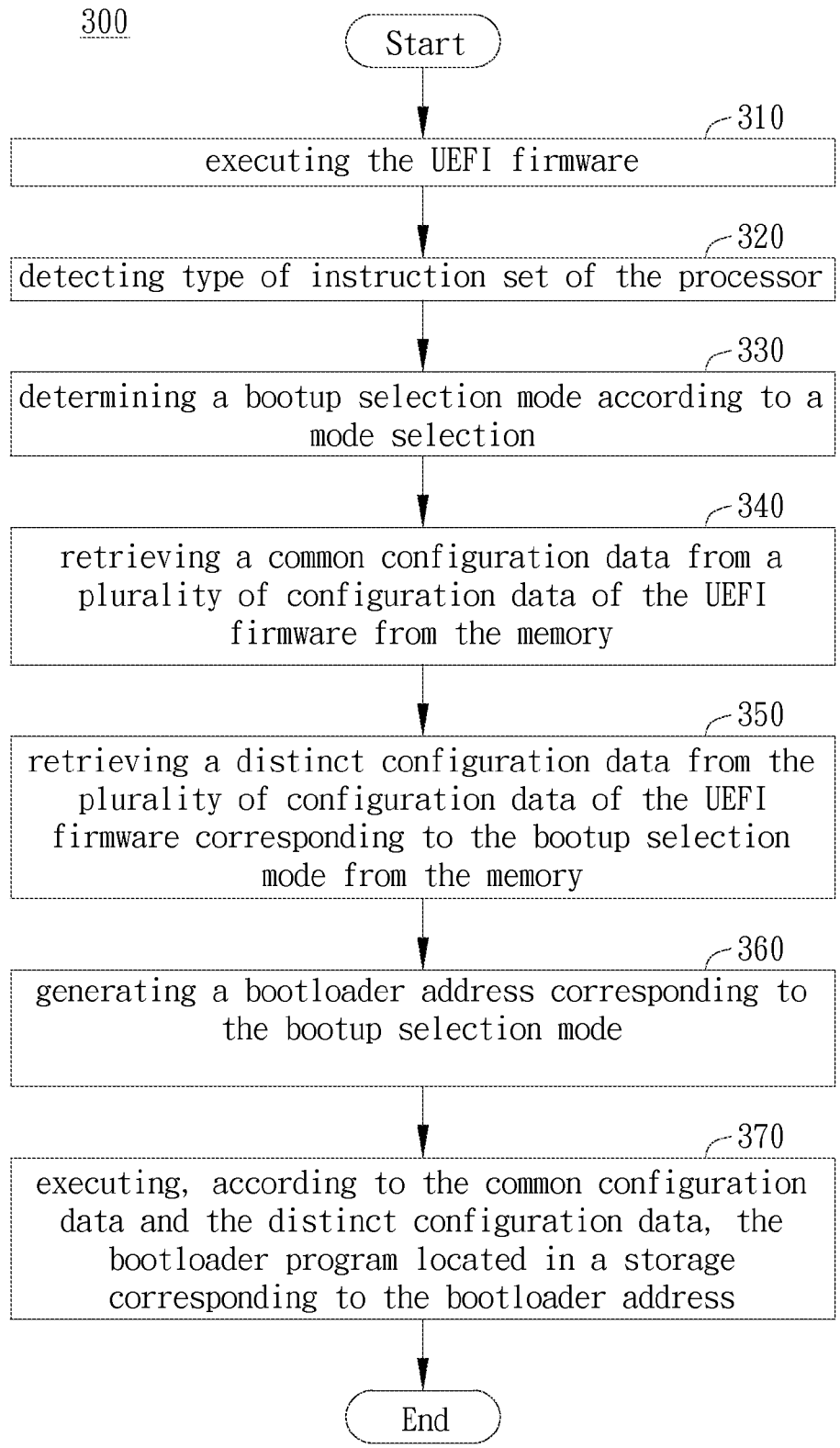
FIG. 7 is an embodiment of a flowchart outlining the steps in the method of the present invention.

Referring to FIG. 7, FIG. 7 illustrates a flowchart of the method of computer processor execution of UEFI firmware supporting pre-boot initialization of a bootloader program from a plurality of bootloader programs. As illustrated in FIG. 7, the method 300 includes steps 310-370. These steps are described in detail below:

Step 310 includes executing, by the processor, the UEFI firmware. As exemplarily shown in FIGS. 1 and 4, the UEFI firmware (136, 422) may be stored in a memory 420, wherein the memory may include Non-volatile Random Access Memory (NVRAM) or flash memory. As shown in FIG. 4, the processor 410 is coupled to the memory 420 and executes the UEFI firmware 422.

Step 320 of the method 300 includes, when executing the UEFI firmware 422, detecting type of instruction set of the processor. As shown in FIGS. 4 and 5, when the computer system 100 is powered ON, the executing UEFI firmware 422 will determine the type of instruction set of the processor. In the present embodiment, for the sake of simplicity, FIG. 5 has been simplified to depict either the instruction set is of x86 processor/chipset architecture or non x86 processor/chipset architecture. One skilled in the art should appreciate that any other types of chipset architectures may be utilized. For example, ARM chipset architecture may also be utilized. By having the UEFI firmware 422 determine the type of instruction set of the processor, the single package of UEFI firmware 422 disclosed by the present invention may provide for UEFI firmware manufacturers and providers a simple singular compiled boot up source code image that can automatically detect what chipset architecture it is being installed into and accordingly initialize hardware. In this manner, UEFI firmware manufacturers may only need to provide one compiled image for a plurality of different computer systems having different chipset architecture.

Step 330 includes determining a bootup selection mode according to a mode selection, wherein the bootup selection mode corresponds to the detected type of instruction set, and the mode selection corresponds to the type of a bootloader program for execution after the UEFI firmware. In the present embodiment, the bootup selection mode. In the present embodiment, the type of instruction set refers to the chipset architecture of the processor in the computer system 100. For instance, if the detected type of instruction set belongs to the x86_64 chipset architecture, the bootup selection mode could be a processor mode in 16-bit, 32-bit or 64-bit, which corresponds to the backwards support of x86_64 chipset for 16-bit, 32-bit, or 64-bit instruction sets. The mode selection, preferably, is determined from detecting a default bootup variable in the common configuration data 427 of the table of configuration data 426. In one embodiment, the default bootup variable in the common configuration data 427 of the configuration data 426 may be viewed as a bootup marker that indicates to the computer system 100 which bootloader program to load up. In the present embodiment, this bootup marker can be set as a GUID variable such that any running Operating System may change the default boot up. In this manner, the next time the computer system 100 is powered ON, the execution of UEFI firmware 422 would boot up to the Operating System corresponding to what the default boot up variable or bootup marker was set to. For instance, if the user was using a 64-bit Operating System and wanted to use a 32-bit Operating System upon restart of the computer system 100, the user could change the default bootup variable or bootup marker through the 64-bit Operating System such that the 32-bit Operating System would automatically be booted up the next time the computer system 100 is powered ON. However, in other different embodiments, the mode selection may be determined from an user input. For example, a console-in such as a keyboard or touchscreen may be initialized after the PEI phase such that users may input or key-in commands to instruct the UEFI firmware to initialize the pre-OS environment under a particular processor mode or to boot up a particular Operating System. In another embodiment, this input command by the user may be interpreted by the processor and the bootup marker can then be correspondingly set. In this manner, since the UEFI firmware has not initialized the pre-OS environment under a particular processor mode yet, the UEFI firmware has the chance to check the bootup marker and continue with the bootup of the desired Operating System.

Step 340 of the method 300 includes retrieving, by the processor, the common configuration data from a plurality of configuration data of the UEFI firmware from the memory. In the present embodiment, the common configuration data 427 of the configuration data 426 includes variables that are common to the initialization of the Pre-OS environment of all operating systems. For instance, if a particular logo is to be shown during POST regardless of which Operating System is to be instantiated, a configuration variable for the logo would be considered common to all bootloader programs present in the computer system 100. This common configuration variable would be stored in the common configuration data 427 and in the process would allow removal of duplicate copies of this particular configuration variable. In this manner, the size of the UEFI firmware as a whole can be decreased so that, for example, clients may have more memory space to add on modifications and new features to the original UEFI firmware. In other words, by packaging multiple UEFI firmware images into one single image package and eliminating duplicate common variables, memory space may be saved for other uses.

Step 350 includes retrieving, by the processor, a distinct configuration data from the plurality of configuration data of the UEFI firmware corresponding to the bootup selection mode from the memory, wherein the distinct configuration data comprises processor instruction sets and runtime services. In the present embodiment, distinct configuration data 427 corresponding to the bootup selection mode is retrieved from the configuration data 426. In other words, configuration variables that are not common to all Operating Systems but are only distinct to the particular bootup selection mode will be retrieved. In another embodiment, the distinct configuration data 427 may include processor instruction sets and may have instructions to provide runtime services for the operating system.

Step 360 includes generating a bootloader address corresponding to the bootup selection mode. In the present embodiment, the processor execution of the UEFI firmware 422 will generate a bootloader address that corresponds to the bootup selection mode. The bootloader address is preferably an address in a storage (such as storage 440) that has a bootloader program that can boot load the desired operating system. For instance, if the bootup selection refers to a processor mode of 32-bit, the processor preferably will generate the bootloader address such that the bootloader address references the bootloader program that will be able to boot up the corresponding 32-bit Operating System.

Step 370 includes executing, according to the common configuration data and the distinct configuration data, the bootloader program located in a storage corresponding to the bootloader address. In the present embodiment, in order to tailor the initialization of hardware device in the processor mode (instruction sets) compliant with the Operating System corresponding to the bootloader program, the common configuration data 427 that was retrieved will be joined with the distinct configuration data 428 corresponding to the particular bootloader program or operating system such that the necessary pre-OS environment before the Operating System is boot up can be fully initialized. In other words, by rejoining the common configuration data 427 with distinct configuration data 428 corresponding to the target Operating System, the UEFI, instructions sets specific to the processor mode of the target Operating System can be executed to initialize any necessary hardware. In addition, along with the distinct configuration data 428 and instruction sets I1 or I2 corresponding to the target Operating System, the UEFI firmware 422 may execute runtime services such that after the target Operating System has been boot up and running, the Operating System may still have access to some hardware services through the runtime services.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A method of computer processor execution of UEFI firmware supporting pre-boot initialization of a bootloader program from a plurality of bootloader programs, the UEFI firmware located in a memory, the memory operatively coupled to the processor, the method comprising:

executing, by the processor, the UEFI firmware;
when executing the UEFI firmware:
    detecting type of instruction set of the processor;
    determining a bootup selection mode according to a mode selection, wherein the bootup selection mode corresponds to the detected type of instruction set, and the mode selection corresponds to the type of a bootloader program for execution after the UEFI firmware;
    retrieving, by the processor, a common configuration data from a plurality of configuration data of the UEFI firmware from the memory;
    retrieving, by the processor, a distinct configuration data from the plurality of configuration data of the UEFI firmware corresponding to the bootup selection mode from the memory, wherein the distinct configuration data comprises processor instruction sets and runtime services;
    generating a bootloader address corresponding to the bootup selection mode; and
    executing, according to the common configuration data and the distinct configuration data, the bootloader program located in a storage corresponding to the bootloader address.

2. The method of claim 1, wherein the step of determining the bootup selection mode further comprising:
    receiving, by the processor, a selection instruction from an interface device; and
    determining the bootup selection mode from the selection instruction.

3. The method of claim 2, wherein the interface device is an input/output device that is coupled to the processor and detected by the UEFI firmware, and the selection instruction is generated by the input/output device.

4. The method of claim 1, wherein the step of determining the bootup selection mode further comprising:
    determining, by the processor, prior to the step of executing the bootloader program, whether a bootup marker has been set in the configuration data of the UEFI firmware, wherein the bootup marker indicates a particular bootloader program:
    if the bootup marker has been set, configuring by the processor the bootup selection mode to correspond to the bootloader program indicated by the bootup marker;
    if the bootup marker has not been set, configuring by the processor the bootup selection mode according to a default bootloader.

5. The method of claim 4, wherein after the step of determining whether the bootup marker has been set, further comprising:
    setting, by the processor, the default bootloader according to the bootup selection mode.

6. The method of claim 4, wherein the graphical user interface comprises a plurality of mode choices, the method further comprising:
    receiving, by the processor, a selection instruction associated with the graphical user interface; and
    determining the bootup selection mode from the selection instruction.

7. The method of claim 1, wherein prior to the step of determining the bootup selection mode, further comprising:
    outputting, by the processor, a graphical user interface for a display device respectively coupled to the processor.

8. The method of claim 1, wherein the step of generating the bootloader address further comprising:

detecting, when executing the UEFI firmware, the type of the instruction sets of the processor;

retrieving, by the processor, the distinct configuration data corresponding to the detected type of the instruction sets in order to respectively execute the bootloader program corresponding to the detected type of the instruction sets of the processor.

9. A Computer System comprising:

a memory storing an UEFI firmware for supporting pre-boot initialization of a plurality of different bootloader programs, wherein the UEFI firmware having a plurality of instructions and a plurality of configuration data for the different bootloader programs; and a processor operatively coupled to the memory and executing the instructions of the UEFI firmware;

wherein the instructions performing the steps of:
  detecting type of instruction set of the processor;
  determining, by the processor, a bootup selection mode according to a mode selection, wherein the bootup selection mode corresponds to the detected type of instruction set, and the mode selection corresponds to the type of a bootloader program for execution after the UEFI firmware;
  retrieving, by the processor, a common configuration data from a plurality of configuration data of the UEFI firmware from the memory;
  retrieving, by the processor, a distinct configuration data from the plurality of configuration data of the UEFI firmware corresponding to the bootup selection mode from the memory, wherein the distinct configuration data comprises processor instruction sets and runtime services;
  generating a bootloader address corresponding to the bootup selection mode; and
  executing, according to the common configuration data and the distinct configuration data, the bootloader program located in a storage corresponding to the bootloader address.

10. The computer system of claim 9, wherein the processor includes a central processing unit, and the memory includes flash memory and read-only memory.

11. The computer system of claim 9, wherein the bootloader program corresponds to an operating system (OS) program.

12. The computer system of claim 9, wherein the step of determining the bootup selection mode in the instructions further comprises:
  receiving, by the processor, a selection instruction from an interface device; and
  determining the bootup selection mode from the selection instruction.

13. The computer system of claim 12, wherein the interface device is an input/output device that is coupled to the processor and detected by the UEFI firmware program, and the selection instruction is generated by the input/output device.

14. The computer system of claim 9, wherein the interface device includes a touch-sensitive screen, a keyboard, a mouse device, a stylus pen, an image sensor, a sound sensor.

15. The computer system of claim 9, wherein the step of determining the bootup selection mode in the instructions further comprises:
  determining, by the processor, prior to the step of executing the bootloader program, whether a bootup marker has been set in the configuration data of the UEFI firmware, wherein the bootup marker indicates a particular bootloader program:
  if the bootup marker has been set, configuring by the processor the bootup selection mode to correspond to the bootloader program indicated by the bootup marker;
  if the bootup marker has not been set, configuring by the processor the bootup selection mode according to a default bootloader.

16. The computer system of claim 15, wherein after the step of determining whether the bootup marker has been set, further comprises:
  setting, by the processor, the default bootloader according to the bootup selection mode.

17. The computer system of claim 9, further comprising a display device for displaying a graphical user interface, wherein the display device is coupled to the processor.

18. The computer system of claim 17, wherein the graphical user interface comprises a plurality of mode choices, the steps in the instruction further comprises:
  receiving, by the processor, a selection instruction associated with the graphical user interface; and
  determining the bootup selection mode from the selection instruction.

* * * * *